United States Patent
Hui et al.

(10) Patent No.: US 10,140,268 B2
(45) Date of Patent: Nov. 27, 2018

(54) EFFICIENT BROWSER COMPOSITION FOR TILED-RENDERING GRAPHICS PROCESSING UNITS

(71) Applicant: Qualcomm Innovation Center, Inc., San Diego, CA (US)

(72) Inventors: Shiu Wai Hui, Richmond Hill (CA); Shyama Prasad Mondal, San Diego, CA (US); Ahmed Sheikh, Toronto (CA)

(73) Assignee: QUALCOMM Innovation Center, Inc., San Diego, CA (US)

( * ) Notice: Subject to any disclaimer, the term of this patent is extended or adjusted under 35 U.S.C. 154(b) by 68 days.

(21) Appl. No.: 15/225,353

(22) Filed: Aug. 1, 2016

(65) Prior Publication Data

US 2017/0061574 A1    Mar. 2, 2017

Related U.S. Application Data

(60) Provisional application No. 62/210,797, filed on Aug. 27, 2015.

(51) Int. Cl.

| | |
|---|---|
| *G06T 1/20* | (2006.01) |
| *G06T 1/60* | (2006.01) |
| *G06F 17/22* | (2006.01) |
| *G06T 15/50* | (2011.01) |
| *G06T 15/00* | (2011.01) |

(52) U.S. Cl.
CPC ........ *G06F 17/227* (2013.01); *G06F 17/2247* (2013.01); *G06T 1/20* (2013.01); *G06T 15/005* (2013.01); *G06T 15/503* (2013.01)

(58) Field of Classification Search
CPC ............ G06T 1/20; G06T 1/60; G06F 17/227
See application file for complete search history.

(56) References Cited

U.S. PATENT DOCUMENTS

| | | | |
|---|---|---|---|
| 8,830,246 B2 | 9/2014 | Seetharamaiah et al. | |
| 9,117,302 B2 | 8/2015 | Seetharamaiah et al. | |
| 9,547,930 B2 | 1/2017 | Seetharamaiah et al. | |
| 2002/0115477 A1* | 8/2002 | Singh | G06F 17/30899 455/566 |
| 2006/0146370 A1* | 7/2006 | Matskewich | G06K 15/02 358/3.26 |
| 2008/0117214 A1* | 5/2008 | Perani | G06T 11/206 345/441 |
| 2009/0132942 A1* | 5/2009 | Santoro | G06F 3/0481 715/765 |

(Continued)

OTHER PUBLICATIONS

QUALCOMM, FlexRender, Mar. 21, 2013, https://www.qualcomm.com/videos/flexrender, 3 pages.

(Continued)

*Primary Examiner* — Gregory J Tryder
*Assistant Examiner* — Yi Yang
(74) *Attorney, Agent, or Firm* — Neugeboren O'Dowd PC

(57) ABSTRACT

Unlike the GPU's FlexRender, a browser engine can intercept rendering at a higher level in the software stack, and because of the simpler nature of the browser tiles that need to be rendered, a browser engine can instruct the GPU to perform composition via traditional tiled-rendering or via direct rendering, where an output of the GPU is written to slower system memory, rather than the faster GPU memory.

3 Claims, 10 Drawing Sheets

(56) References Cited

U.S. PATENT DOCUMENTS

| | | | | |
|---|---|---|---|---|
| 2012/0011377 A1* | 1/2012 | Yu | ............................ | G06F 1/206 |
| | | | | 713/300 |
| 2013/0135341 A1* | 5/2013 | Seetharamaiah | ..... | G06T 15/005 |
| | | | | 345/619 |
| 2013/0328895 A1* | 12/2013 | Sellers | ....................... | G06T 1/00 |
| | | | | 345/522 |
| 2014/0267327 A1* | 9/2014 | Pelton | ........................ | G06T 1/20 |
| | | | | 345/522 |
| 2015/0023577 A1* | 1/2015 | Li | .......................... | G06T 7/0012 |
| | | | | 382/131 |

OTHER PUBLICATIONS

QUALCOMM Technologies, Inc., Qualcomm® Adreno™ OpenGL ES Developer Guide, May 1, 2015, 170 pages.

* cited by examiner

EFFICIENT BROWSER COMPOSITION FOR TILED-RENDERING GRAPHICS PROCESSING UNITS

CROSS REFERENCE TO RELATED APPLICATIONS

The present Application for Patent claims priority to Provisional Application No. 62/210,797 entitled "Efficient Browser Composition for Tiled-Rendering Graphics Processing Units" filed Aug. 27, 2015, and assigned to the assignee hereof and hereby expressly incorporated by reference herein.

BACKGROUND

Field of the Disclosure

The present invention relates to content display devices. In particular, but not by way of limitation, the present invention relates to apparatus and methods for improving the display of content on content display devices.

Description of Related Art

Content display devices such as smartphones, netbooks, gaming devices, PDAs, desktop computers, televisions, and laptop computers are now ubiquitous. And these devices now very commonly include hardware that provides network connectively to web servers and software (e.g., web browsers) that provide an interface for users to request and view content from these web servers.

The content that is provided by these web servers, and displayed on these content display devices, is increasingly dynamic in nature. In addition to graphically intensive games, for example, it is very common for a variety of content associated with a webpage to include animations, which may be animated out by rendering a series of bitmap images to create the appearance of motion. Common and ongoing issues with the display of this type of content are maintaining the quality of a user's experience while managing limited power resources.

More specifically, users have become accustomed to viewing animated content in a smooth, fast, and uninterrupted manner Although content display devices continue to be produced with more and more advanced graphics processing resources, these resources are still not fast enough to provide seamless, consistent animation and/or these advanced content display devices demand more and more power, which is often limited.

Existing graphics processing units (GPUs) have a tiled-rendering (or binning) architecture, which divides the output render target (GPU cache) into "tiles" onto which it renders to separately. Each tile fits into a fast dedicated memory when the GPU is rendering onto it. The dedicated graphics memory allows rapid and repeated read/write operations which are often beneficial for complex rendering operations (e.g., alpha-blending, z-buffer access, and operations using a large amount of overdraw). Typically the size of the graphics memory is limited, and has less capacity than system memory, so only a portion of the render target can fit within the graphics memory. Because of the limited size of the graphics memory, the render target is broken into tiles. Once a tile is rendered, it is copied from the graphics memory to the system memory, which is often slower than the graphics memory, but has a larger capacity. While use of the graphics memory is advantageous when complex and repeated rendering operations on the same tile are in order, the overhead of dividing up the render target into tiles can be great.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One aspect of this disclosure can be described as a system comprising a processing portion, a system memory, a graphics processing unit, and a rendering mode analysis component. The graphics processing unit can have a graphics processing memory thereon. The rendering mode analysis component can be stored on the system memory and executable on the processing portion to: access from system memory bitmaps rasterized from HTML; compute a weighted total of pixels in the composition intersecting pixels of other of the bitmaps, the weighting based on a transparency of any intersecting pixels from different bitmaps; and if the weighted total of pixels is greater than a direct-rendering mode threshold, then instruct the graphics processing unit to render to the graphics memory. If the weighted total of pixels is less than or equal to the direct-rendering mode threshold, then the rendering mode analysis component can be executable to instruct the graphics processing unit to render to the system memory without rendering to the graphics memory.

Another aspect of this disclosure can be described as a method of rendering browser content. The method can include parsing HTML into browser tiles stored in system memory. The method can further include analyzing a layout of a DOM tree of the HTML to determine whether an output of a composition of the browser tiles should be cached on a GPU before being written back to the system memory or written directly to the system memory, the analyzing can look at a complexity of the composition. The method can yet further include performing the composition of the browser tiles on the GPU and writing an output of the composition to a cache of the GPU and then to the system memory or directly to the system memory based on the analyzing.

Yet a further aspect of the disclosure can be described as a non-transitory, tangible processor readable storage medium, encoded with processor executable code to perform a method for selecting between browser engine direct rendering and tiled-rendering. The method can include parsing HTML into browser tiles stored in a system memory. The method can further include analyzing a layout of a DOM tree of the HTML to determine whether an output of a composition of the browser tiles should be cached on a GPU before being written back to the system memory or written directly to the system memory. The analyzing can look at a complexity of the composition. Further, the method can include performing the composition of the browser tiles on the GPU and writing an output of the composition to a cache of the GPU and then to the system memory or directly to the system memory based on the analyzing.

A further aspect of the disclosure can be described as a system comprising various means. These means can include means for parsing HTML into browser tiles stored in a system memory. These means can also include means for analyzing a layout of a DOM tree of the HTML to determine whether an output of a composition of the browser tiles should be cached on a GPU before being written back to the system memory or written directly to the system memory. The analyzing can look at a complexity of the composition. The means can also include means for performing the composition of the browser tiles on the GPU. Lastly, the means can include means for writing an output of the composition to a cache of the GPU and then to the system memory or directly to the system memory based on the analyzing.

DETAILED DESCRIPTION

Figure 1:
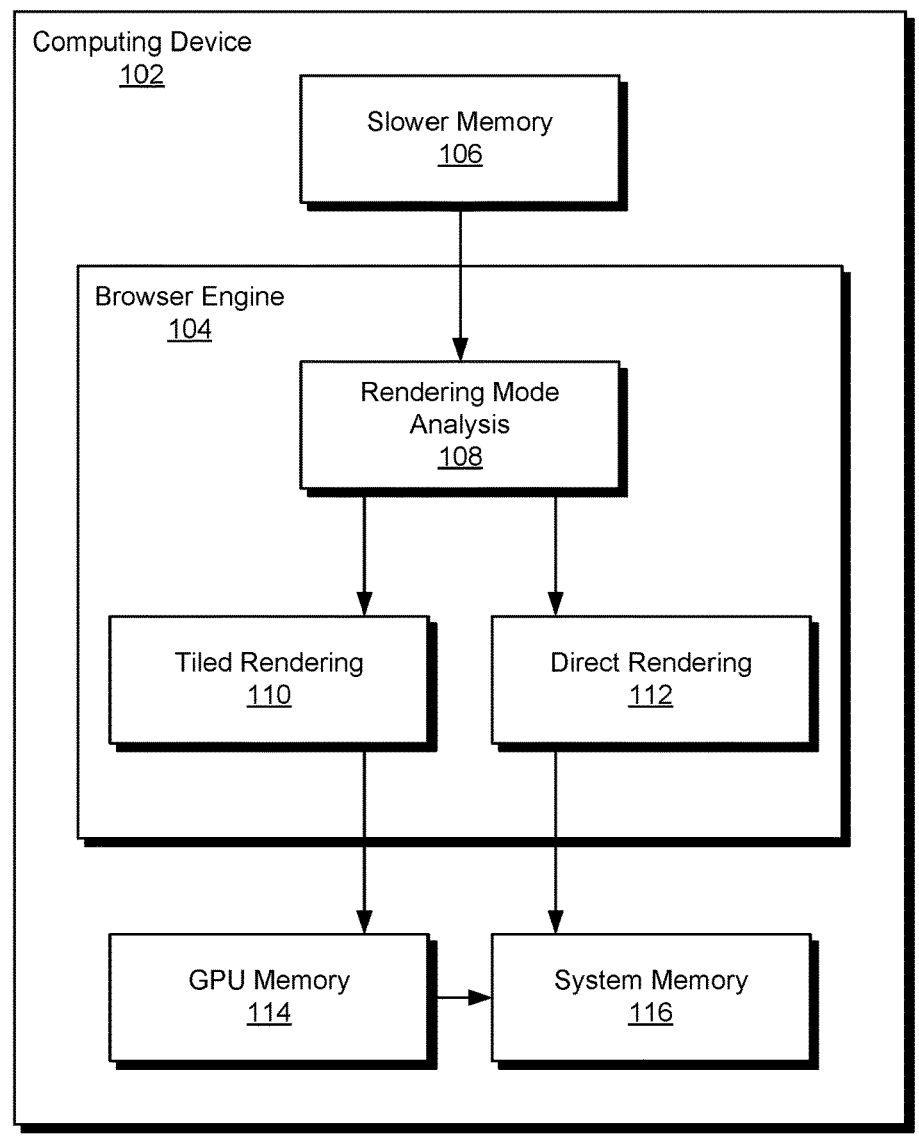
FIG. 1 is a block diagram depicting an embodiment of an exemplary content display device.

As used herein, a "render target" defines a destination of a rendering process. For instance, a render target may be described as a type of memory and/or a location in memory. As a further example, a GPU may have an on-board cache, or GPU cache, as a render target, or system memory as a render target.

As used herein, a "bitmap" (or "texture") is a buffer of pixel values in system memory.

As used herein, "rasterization" is the phase of rendering where the bitmaps underlying different layers of a webpage are filled or rendered to from the HTML.

As used herein, a "browser tile" is a tile a browser divides the web page into.

As used herein, a "GPU tile" is a tile that a GPU divides the render target into. GPU tiles are typically smaller than browser tiles, and typically their size is dictated by a size of the GPU cache.

As used herein, "compositing" is the phase of rendering that combines layers' bitmaps into a final screen image. This is done by the GPU.

As used herein, a "browser window" is an extent of the display in which a webpage can be displayed. While a webpage may contain more data than can fit in the browser window, and browser tiles and GPU tiles may extend beyond the browser window, only that data within the browser window is displayed and visible to a user. A viewport can be used interchangeably with browser window, although they suggest different reference points of view. For instance, during scrolling, the browser window is static while the document scrolls through the browser window. In contrast, during scrolling, the viewport is moving relative to the document. Said another way, scrolling involves a document moving relative to a browser window and a viewport moving relative to the document.

As used herein, "overdraw" is where two or more shapes overlap in rendering, and both are rendered, despite the fact that in the final display, one of the shapes, or part of one of the shapes, will occlude part of or a whole of the other shape (this applies for opaque as well as transparent shapes). In other words, the rendering process and all the computing resources expended to perform that rendering, may be wasted for those pixels that are not visible because blocked by other pixels. Overdraw was a major reason that tiled-rendering was developed and a primary reason why direct-mode renderers are hard to find today.

As used herein, "direct mode rendering" means that bitmaps in system memory are composited by the GPU and the output is written to system memory or the frame buffer. In contrast, "tiled-rendering" means that bitmaps in system memory are copied to GPU memory, the GPU performs composition on these bitmaps, and then output is written to the GPU memory. Transformations, shaders, transparency, and other processes can be performed on the bitmaps while they are in GPU memory, thereby avoiding the need to recreate or re-rasterize the bitmaps. Depth determinations, or calculations to determine which bitmaps occlude each other, can be performed before textures, shaders, and other processes are carried out on the bitmaps, thus avoiding overdraw. In other words, tiled-rendering avoids overdraw and also allows changes to portions of a window to be made without re-rasterizing all bitmaps in the window.

As used herein, a "browser engine" (sometimes called layout engine or rendering engine) is a program that renders marked up content (such as HTML, XML, image files, etc.) and formatting information (such as CSS, XSL, etc.).

FIG. 1 is a block diagram depicting an embodiment of an exemplary content display device 100. As discussed further herein, the exemplary content display device 100 provides an improved user experience and/or reduced power (or lower power) consumption relative to prior approaches. In some variations, additions and modifications readily apparent to one of ordinary skill in the art—in light of this disclosure—may be made to an existing browser engine. For example, a Webkit engine may be modified to effectuate the methodology and functionality discussed herein.

The content display device 100 may be realized by a variety of devices such as smartphones, netbooks, gaming devices, PDAs, desktop computers, televisions, tablets, and laptop computers, and the content display device may include any of a variety of applications that a user interacts with to request, retrieve and view content such as a web browser, or any of a variety of other applications that utilize animated content (e.g., gaming, utility, and educational apps).

As shown, the browser engine 104 of the content display device 100 includes both a tiled-rendering component 110 and a direct rendering component 112 to support both tiled-rendering and direct rendering. As discussed above, tiled-rendering has both benefits and undesirable aspects. This disclosure discusses an available and occasional alternative to the tiled-rendering mode of operation, which is the direct rendering mode. In direct rendering mode, the direct rendering component 112 may operate a GPU in a direct-rendering mode where it renders to the whole render target residing in a slower system memory 116. In other words, while tiled-rendering means that composition involves the GPU compositing GPU tiles and outputting the composited tiles to a GPU memory 114, or graphics memory, and then copying the composited tiles to the slower system memory 116, direct rendering means that composition is performed on the GPU, but the output is sent directly to system memory 116. Because direct rendering avoid the GPU memory 114, direct rendering thereby avoids the overhead associated with dividing the render target, the browser window (or viewport), into GPU tiles. While the read and write operations are faster to the graphics memory than to the system memory, the GPU cache has a limited size, and typically cannot store an entire browser window or even an entire bitmap. Therefore, when tiled-rendering is used, the GPU first splits the browser window, and the bitmaps that cover the browser window, into GPU tiles. In other words, the GPU performs its own tiling of the webpage that is different from the browser tiles that are created via parsing the HTML and browser engine rasterization of the parsed HTML. This secondary tiling utilizes GPU resources that can be conserved in direct rendering mode.

The direct rendering mode avoids the GPU cache and thereby avoids the geometry processing overhead of GPU tiling. However, direct rendering is not advantageous in all situations. GPU cache can be written to and read from faster than system memory, so in instances where lots of composition processes on a single GPU tile are desired (e.g., shaders and alpha blending), using the GPU cache and tiled-rendering may be preferred. In contrast, read/write operations to a render target in system memory (i.e., direct rendering) are much more expensive (e.g., slow). For simple composition, such as composition involving simple rectangles having low pixel intersection between webpage windows, little to no shader passes, and few transparent pixels, direct rendering, may be preferable. For the purposes of this disclosure, a "low pixel intersection" means that a number of overlapping pixels is less than "X" times a pixel count of the render target, where X can be tailored to balance memory speeds (e.g., system memory versus graphics memory). For instance, where X=2 and the render target is around 1.1 million pixels (e.g., a 1056×1056 pixel render target), then a "low" pixel intersection would be instances where less than 2.2 million pixels overlap. X may tend to be larger where graphics memory is faster than system memory, and as the speed of system memory approaches that of graphics memory, the value X may approach 1. Where graphics memory is around twice as fast as system memory, a value of X=2 may be appropriate. Direct rendering can also reduce power consumption by bypassing the GPU cache such that parts of the GPU processing pipeline hardware can be turned off for geometry processing. Thus the power reduction from direct rendering can be two-fold.

The rendering mode analysis component 108 enables the browser engine 104 to take advantage of both tiled-rendering mode and direct-rendering mode, meaning that greater power savings is possible than in the art. More specifically, the rendering mode analysis component 108 operates to control the rendering mode component 110, 112 that is utilized to reduce power that is drawn by the GPU while maintaining a desirable user experience. Because the two rendering modes components 110, 112 are suitable for different types of rendering operations, the rendering mode analysis component 108 is configured to select the rendering mode component 110, 112 that is used in order to avoid negatively affecting performance or power.

When tiled-rendering, or a tiled-rendering mode component 110, is selected, the GPU renders to the GPU memory 114 (e.g., GPU cache or graphics memory) as the render target, and then the cached data is blitted or copied to the system memory 116 or the frame buffer for rendering to the display. When direct rendering, or a direct rendering mode 112, is selected, the GPU renders directly to the system memory 116, and bypasses the GPU memory 114.

The following description helps explain the advantages of a browser engine able to switch between direct and tiled rendering for compositing. In the rendering pipeline of the browser engine 104 (or browser rendering pipeline), webpages are processed to form a list of drawing commands (e.g., draw text, draw bitmap, etc.). The webpage, the drawing commands, are partitioned into multiple browser tiles, and each is executed (rasterized) onto bitmaps. The bitmaps (textures) are then composited onto the browser window 601. By varying the positions of these bitmaps between frames, the effect of scrolling is achieved.

The browser engine 104 may utilize the GPU to perform the following (including some operations noted above):
1. Rasterization of web pages into bitmaps;
2. Compositing the bitmaps to the browser window;
3. Drawing the browser user interface (UI);
4. Displaying video; and
5. Rendering an HTML5 Canvas or WebGL content.

Of the above-identified five GPU operations, the compositing of bitmaps to the browser window may be the most suitable for selectively engaging the direct rendering mode component 112 to effectuate direct rendering. This is because compositions are essentially image blits (copying an image from one memory location to another) which, in some situations, only use a single write to the render target. In other words, composition at the browser engine level often involves fewer read/write operations than other processes, and therefore by directly rendering the composition process and thereby avoiding GPU tiling and the GPU cache, direct rendering of the compositing saves substantial processing power (i.e., enables the GPU to enter a lower-power state).

The rendering mode analysis component 108 may analyze a proposed composition to detect the following:
A. Bitmaps that do not overlap each other in the browser window—comprising little overdraw on the render target (e.g., each pixel in the render target is contributed by only one source bitmap)
B. The bitmaps are opaque, devoid of alpha blending.
C. Optionally, some overdraw or alpha blending is allowed, e.g., up to a certain threshold.

If all rendering for the browser window satisfies the above, the rendering mode analysis component 108 can instruct the GPU to perform direct-rendering with the direct rendering mode component 112 for that frame. In other words, if a composition does not involve any calculation of overlapping pixels or intersection between pixels of different browser windows, and all bitmaps in the composition are opaque, then the GPU can be instructed to perform direct rendering. In an alternative, some level of overlap and/or transparency of pixels may be allowed while still turning to direct rendering. Where some level of overlap and/or transparency is allowed, there may be a threshold that is compared to a quantitative value assigned to the composition (the value representing the number of pixels overlapping or intersecting in the composition and/or a number of pixels affected by transparency). In an embodiment, the value may be larger for more complex compositions (e.g., where lots of alpha blending is involved or larger numbers of pixels overlap), and is zero when there is no overlap and no transparency. For instance, the threshold relative to overlapping pixels may be equal to around twice a number of pixels in the browser window. The rendering mode analysis component 108 can use a first API to direct the GPU to perform direct rendering and can use a second API to direct the GPU to perform tiled rendering.

Alternatively, a weighted sum of values assigned to the composition can be compared to a threshold. For instance, the rendering mode analysis component 108 can analyze a weighted total of pixels in the composition intersecting pixels of other of the bitmaps, wherein the weighting considers transparency of any intersecting pixels from different bitmaps. If the weighted total of the pixels is greater than a direct-rendering mode threshold, then the component 108 can instruct the graphics processing unit to render to the graphics memory. If the weighted total of the pixels is less than or equal to the direct-rendering mode threshold, then the component 108 can instruct the graphics processing unit to render to the system memory without rendering to the graphics memory.

Optionally, the browser engine 104 may analyze proposed compositions and select tiled-rendering, despite little to no overlap or transparency, where the following operations are identified in the proposed composition:
  D. No complex transforms of the bitmap. (no rotation, three-dimensional (3D) transforms); and
  E. Simple sample of bitmaps (no complex shader processing).

Alternatively, if these operations are identified, then the GPU can turn off additional stages of the rendering pipeline (e.g., shaders and transforms) and thereby conserve additional power to what has already been mentioned above.

Sometimes, the composition involves drawing things other than bitmaps. For example, solid (opaque) color fills are sometimes drawn. These are also suitable for direct rendering.

Figure 2:
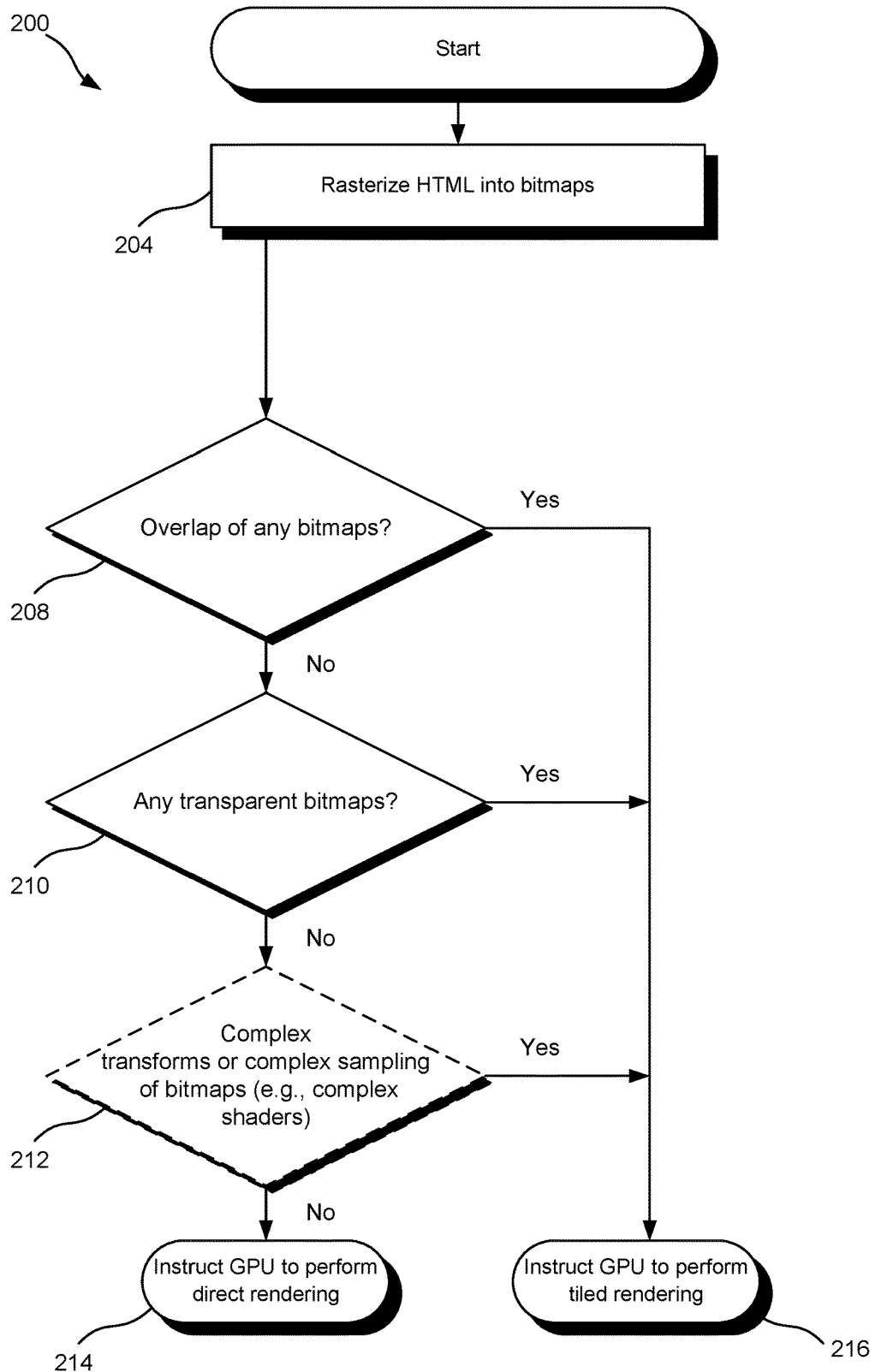
FIG. 2 illustrates a method of a browser determining whether to perform direct or tiled-rendering.

FIG. 2 illustrates a method of a browser engine determining whether to perform direct or tiled-rendering. In particular, the method 200 is implemented in a browser engine that receives HTML code. The browser engine can rasterize the HTML into browser tiles that are saved in bitmaps (Block 204). The bitmaps are then ready for composition, so a rendering mode analysis component (e.g., 108 in FIG. 1) can analyze a proposed composition of the bitmaps. This analysis can include looking at multiple aspects of the composition, such as overlap of pixels (Decision 208), transparency or alpha blending (Decision 210), and optionally the complexity of transforms and sampling (Decision 212). In particular, if the rendering mode analysis component finds that there is any overlap of any bitmaps in the proposed composition (Decision 208), any transparent bitmaps (Decision 210), or optionally any non-trivial transforms or non-trivial sampling of bitmaps (e.g., processing of complex shaders) (optional Decision 212), then the rendering mode analysis component turns the browser engine to tiled-rendering mode and instructs the GPU to perform tiled-rendering of the composition (Block 216). If none of these resource-intensive operations are found, then the rendering mode analysis component can turn the browser engine to direct rendering mode and instruct the GPU to perform direct rendering of the composition (Block 214). While FIG. 2 has been described relative to absolutes of the Decisions 208, 210, and 212, in other embodiments, a less black and white approach may be taken. For instance, values can be assigned for overlay, transparency, and complexity of the composition, and the total of these values can be compared to a threshold. In this way, some amount of overlap, transparency, and optionally the consideration of complex compositions can be allowed while still turning to direct rendering.

Trivial transforms are those that are supported by an API that triggers direct rendering. For instance, in an embodiment where the API that triggers direct rendering is capable of scaling and 90° rotations, a 60° rotation or a perspective transformation would be considered non-trivial. However, in other instances, the API may be able to handle all types of 2D and 3D transformations, in which case there will not be any cases considered "non-trivial." Trivial sampling of bitmaps occurs when the API triggering direct rendering supports a given fragment/pixel shader. So, where a shader requires more than a simple texture fetch, this sampling is considered non-trivial. For instance, gradients, blurred shadows, and intricate text are just a few examples of features that could cause sampling to be non-trivial. Sampling takes place when a shader instructs the GPU to fetch a texel of a texture (a single pixel from a texture).

A shader is a program running on the GPU that specifies, for the geometry currently being drawn (e.g., rectangles), how the geometry contributes to the color of a particular pixel in the render target. Shaders operate by the GPU accessing system memory or texture memory to obtain a color of a texel and returning this to the shader. If the sampling location is not an integer, then the GPU can fetch multiple texels in the surrounding area and perform an interpolation to obtain a final color. This may be done every time the shader issues a texture fetch instruction to the GPU.

A simple shader just fetch one texel from a source texture—an output of the shader is just that color of one pixel from the source texture. A complex shader, on the other hand, can choose another texel to fetch, modify the fetch texel color, fetch multiple texels from the same texture or from different textures, etc. An example of a fetch from more than one texture can be 1) a MIPMAP texture which consists of multiple resolutions of the same texture, 2) a cubemap texture, etc. An example of a non-trivial shader in the browser is a shader that modifies the color of the fetch texel to change the color temperature, etc.

Figure 3:
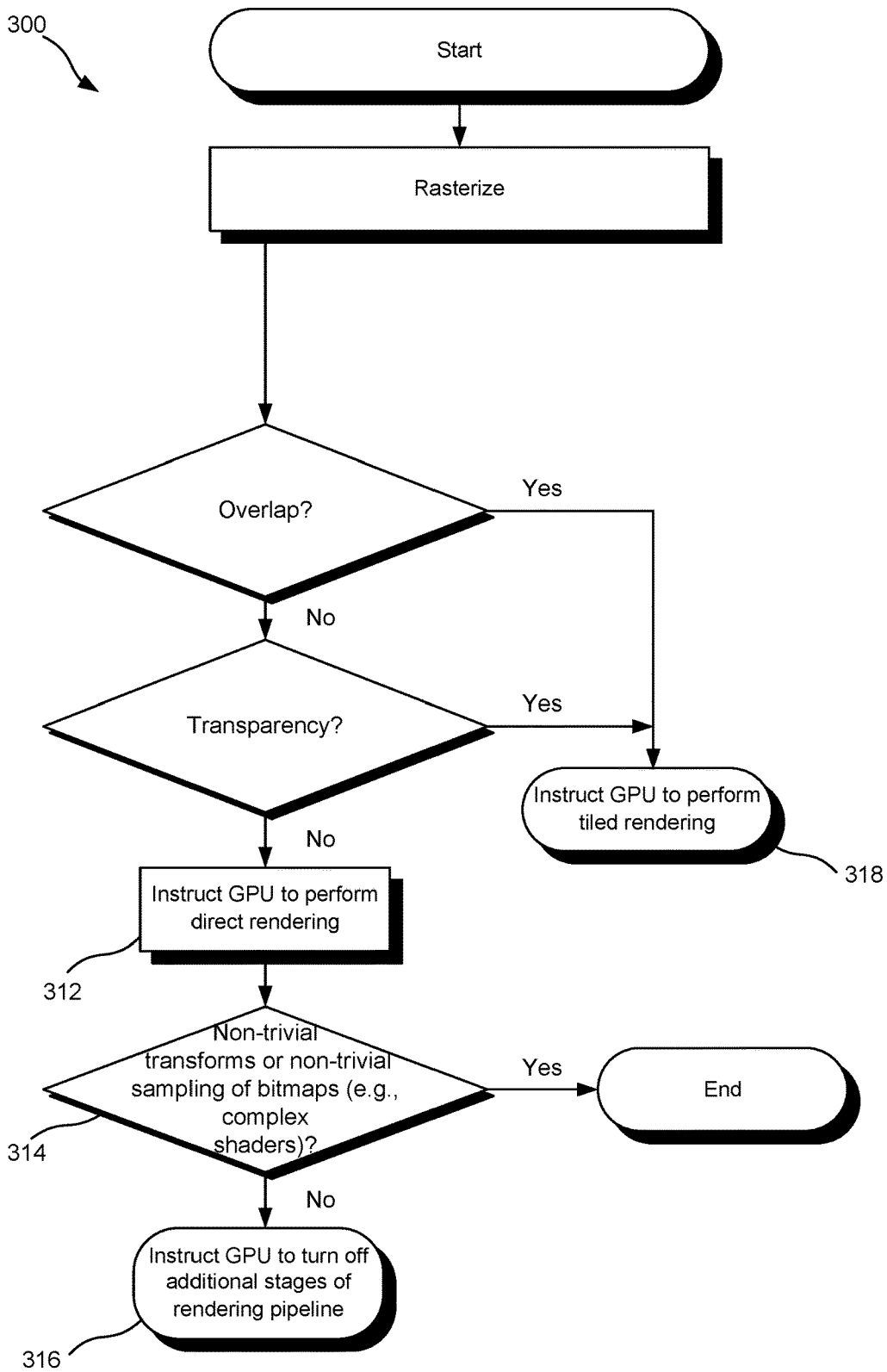
FIG. 3 illustrates a method of selecting between direct and tiled-rendering modes, where the absence of complex transforms or complex sampling of bitmaps can lead to further aspects of the rendering pipeline being turned off.

In some instances, further aspects of the rendering pipeline can be turned off when certain conditions are met. FIG. 3 illustrates a method of selecting between direct and tiled-rendering modes, where the existence of no more than trivial transforms or trivial sampling of bitmaps can lead to further aspects of the rendering pipeline being turned off. In particular, once the rendering mode analysis component instructs the GPU to perform direct rendering (Block 312), the rendering mode analysis component can determine if any non-trivial transforms of bitmaps or complex sampling of bitmaps (e.g., processing of complex shaders) is expected in the proposed composition (Decision 314). If not, then the rendering mode analysis component can instruct the GPU to turn off additional stages of the rendering pipeline, such as shader processing. If either of these are expected (Decision 314), then the method 300 can continue instructing the GPU to perform direct rendering without more. In some instances, the Decision 314 can assign a value to the complexity of the transforms and/or sampling and compare this value to a threshold. If the value exceeds the threshold, then the method 300 ends, while if the value does not exceed the threshold, then the method 300 can instruct the GPU to turn off additional stages of the rendering pipeline (Block 316).

Figure 4:
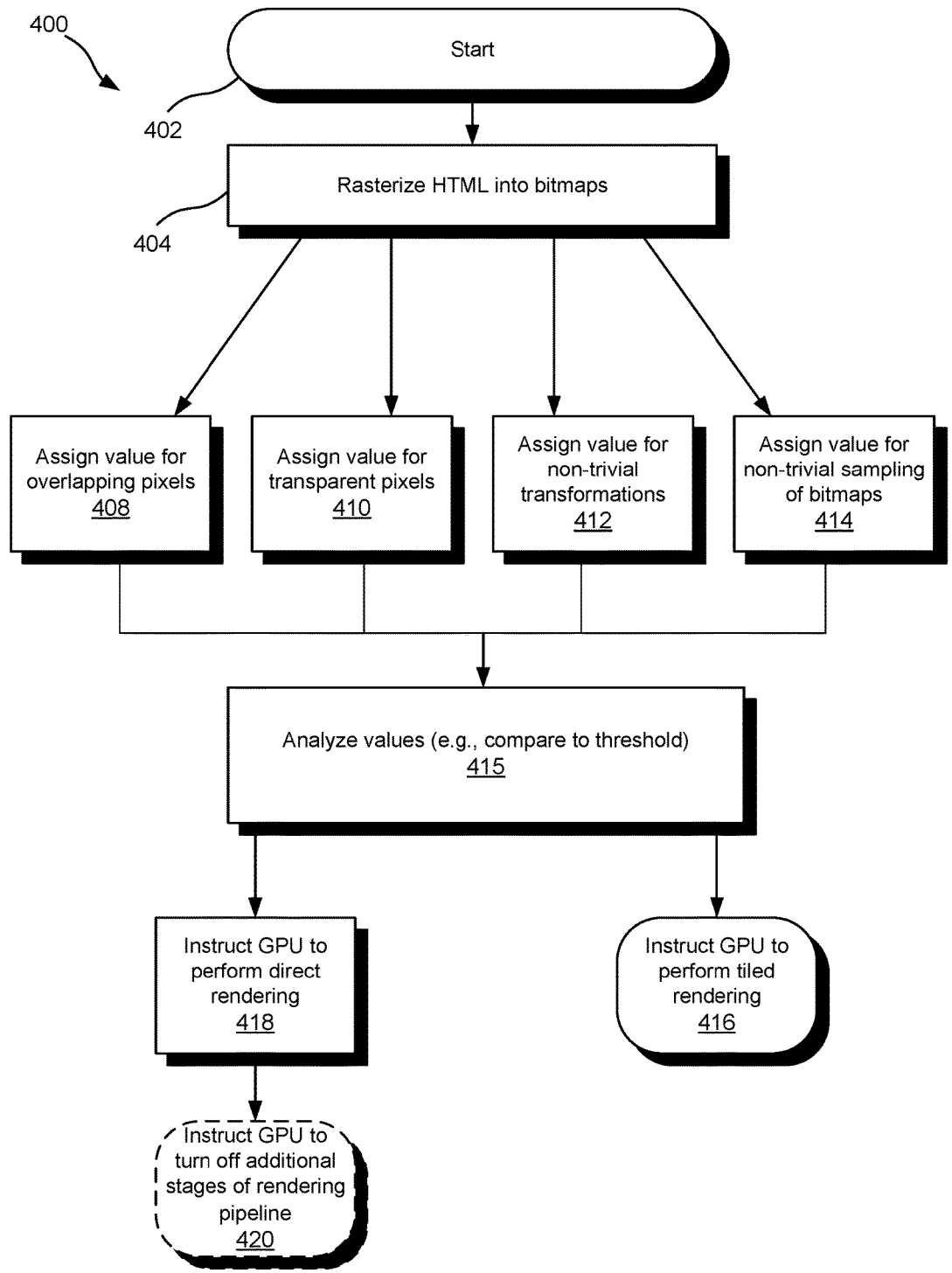
FIG. 4 illustrates an alternative method to FIG. 2, and one in which a threshold relative to the complexity of the composition is used to determine whether direct or tiled-rendering is to be used.

FIG. 4 illustrates an alternative method to FIG. 2, and one in which a threshold relative to the complexity of the composition is used to determine whether direct or tiled-rendering is to be used. Here, a browser engine can carry out the method 400 starting with rasterization of the HTML into bitmaps (Block 404). A rendering mode analysis component of the browser engine can then analyze the HTML to determine whether direct or tiled-rendering should be carried out. In particular, the browser parses an HTML to create a DOM tree and then calculates a layout of the elements in the DOM tree. This layout can be stored as a data structure that describes how the elements on the page are grouped into layers and where each webpage element is drawn. Elements in each layer are then rasterized to bitmpas or browser tiles. The rendering mode analysis component can look at the layers (e.g., a bounding box of each layer) and how they intersect the browser window (or viewport), and this can occur before, in parallel, or after rasterization. This analysis can include assigning a value to the composition based on a number of overlapping or intersecting pixels (Block 408), a number of transparent pixels (Block 410), a number and quality of transformations of the bitmaps (Block 412), and a complexity of sampling of the bitmaps (Block 414). For instance, and addressing a number of transparent pixels (Block 410), a memory write value can be assigned for each pixel of an opaque layer that intersects the browser window, and one memory write value and one memory read value can be assigned for each pixel of a transparent layer that intersects the browser window. Based on an analysis of these values (Block 415) and optionally a comparison of these values to a threshold, the rendering mode analysis component can instruct the GPU to perform direct rendering (Block 418) or tiled-rendering (Block 416). These values can also optionally be used to determine whether to instruct the GPU to turn off additional stages of the rendering pipeline (optional Block 420).

Figure 6:
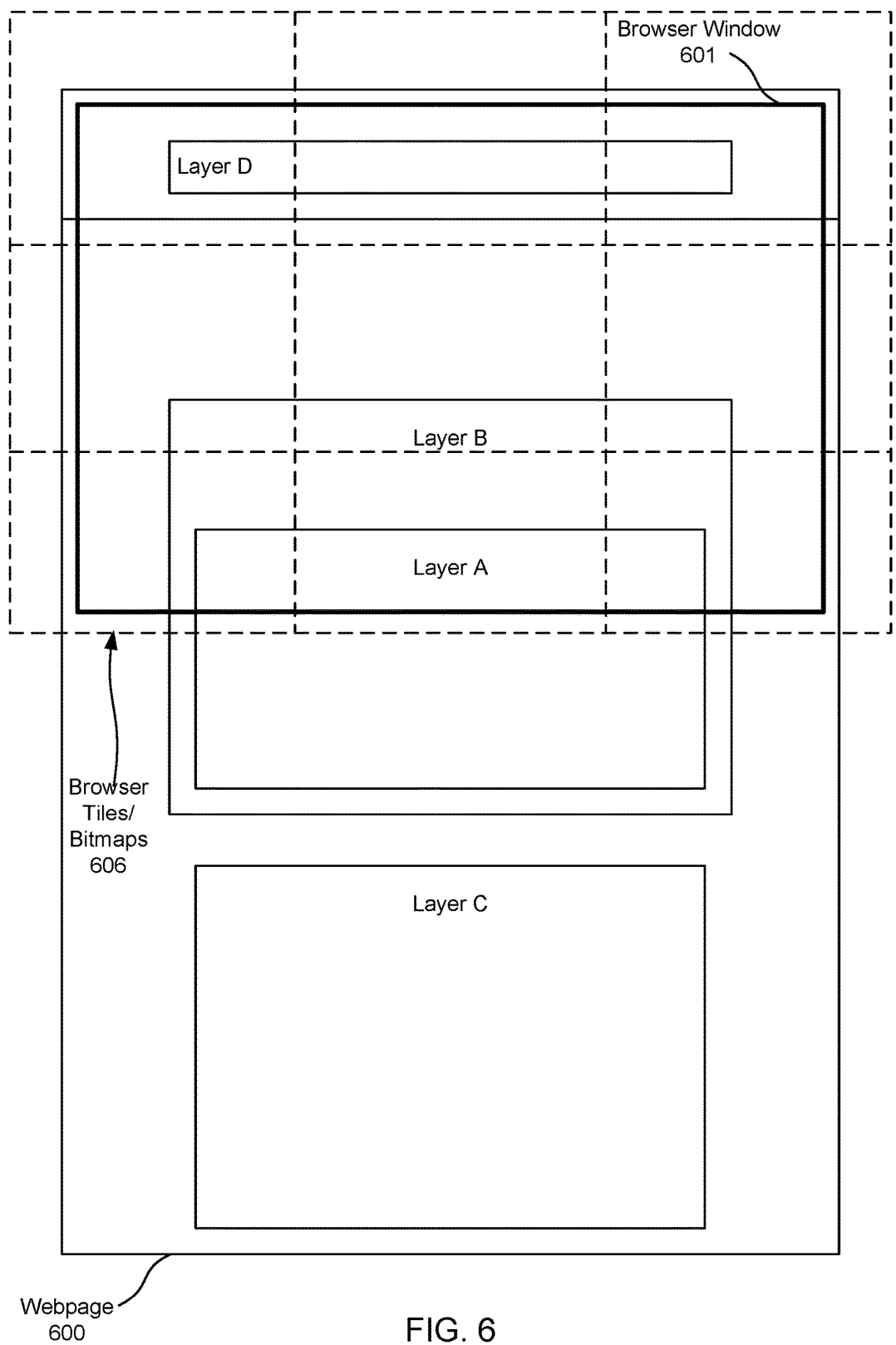
FIG. 6 illustrates an example of a browser window and a display window.
Figure 7:
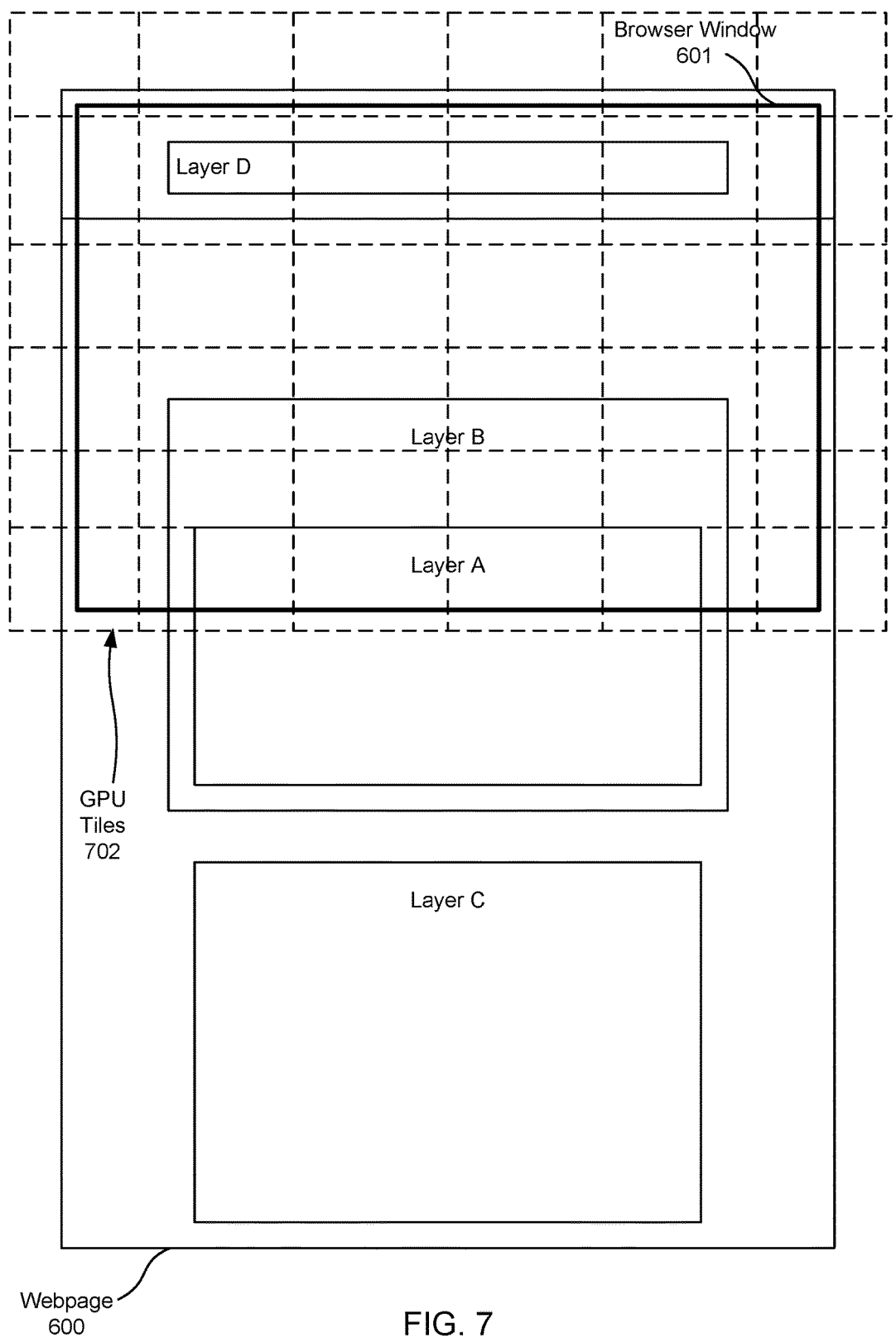
FIG. 7 illustrates the browser window of FIG. 6, but with the display window divided into GPU tiles rather than bitmaps.

FIGS. 6 and 7 show a webpage and browser window, with the browser window divided into browser tiles (FIG. 6) and GPU tiles (FIG. 7). The webpage 600 is typically larger than the browser window 601 (or viewport) and thus includes content that cannot all be displayed at once. Thus, the browser engine only renders those portions of the webpage expected to be visible, or visible soon after scrolling. In this example, this means dividing the webpage 600 into nine browser tiles or bitmaps 606 and rasterizing the associated drawing commands to nine browser tiles or bitmaps 606 in the system memory. The illustrated browser tiles or bitmaps 606 are not rendered to scale.

The webpage 600 can include a variety of windows or layers including, for instance, a URL bar 604, and layers A, B, and C. Layer A is above layer B. During composition, the GPU takes the browser tiles or bitmaps 606, and for each one, determines what pixels from what layers are to be displayed. If direct rendering is used, then the render target for the GPU composition is the system memory (in other words, the GPU writes the output of composition in system memory).

If tiled-rendering is selected (see FIG. 7), then the GPU renders to the GPU cache, which in this example, may only be large enough to handle the GPU tiles 720 shown in FIG. 7. Thus, the GPU takes the browser tiles or bitmaps 606 from FIG. 6, performs one or more compositions on the browser tiles or bitmaps 606 and renders the final GPU tiles 720 to the GPU cache. Further operations can be performed on the GPU tiles 720 while in the GPU cache (e.g., shader passes and alpha blending, to name two), and once finished, the GPU can write the GPU tiles 720 to the system memory.

Figure 8:
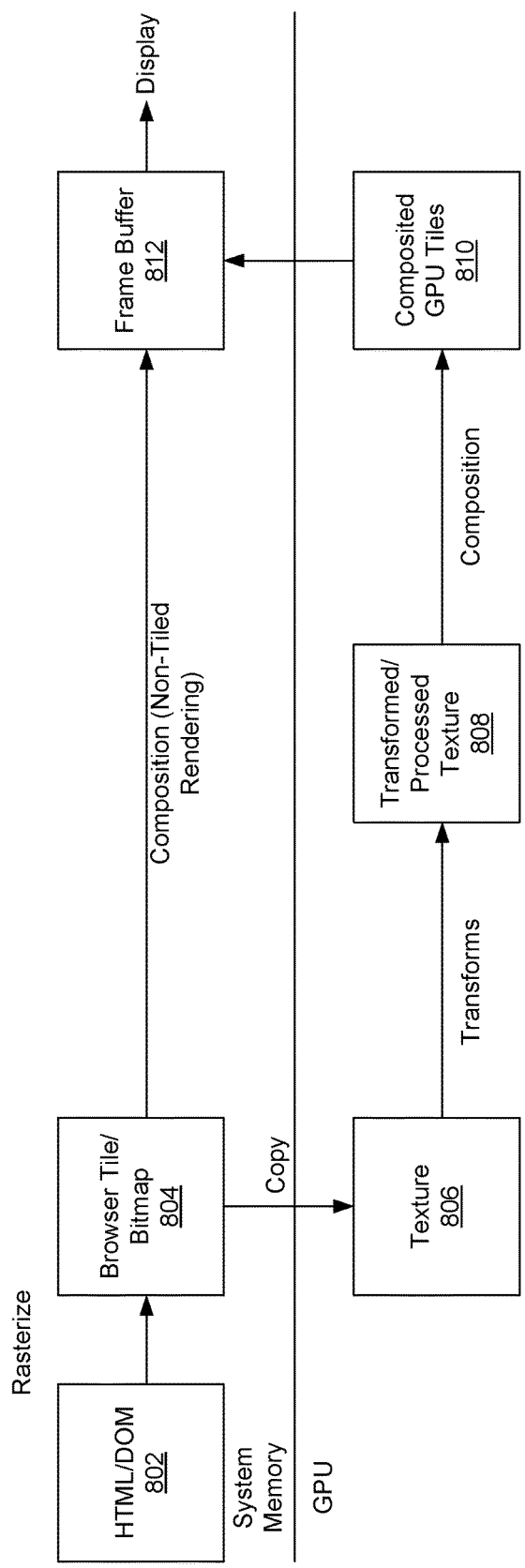
FIG. 8 illustrates a flow diagram for tiled and direct rendering.

FIG. 8 illustrates another embodiment of a method for selecting between direct and tiled rendering. The HTML 802 can arrive via a network interface, and be parsed into the DOM 802, which can be stored on the system memory. Accessing the HTML 802 may include receiving the HTML 802 via a network interface, or retrieving the HTML 802 from the system memory. The DOM 802 can then be split into groups and these groups can be rasterized as browser tiles 804 and each stored in a bitmap 804, which is again located in system memory. Rasterization is one of the most resource-intensive tasks in the browser engine. For composition, the browser tiles or bitmaps 804 can be copied or blitted to GPU memory, or the GPU cache, as a texture 806. The textures 806 can be reused for multiple frames, thus avoiding the resource-intensive process of rasterization for many aspects of a webpage. For instance, transforms can be performed on the textures 806. Rotation of a texture 806 is one example of a transform. So, for instance, a texture 806 can have a certain orientation for a first frame of the webpage. If the next frame has the texture 806 appearing at a different angle, rather than re-rasterize the DOM 802 underlying the texture 806, the texture 806 can merely be transformed in GPU memory and then composited and displayed. Complex graphics processing can also be performed on textures 806 in GPU memory, again avoiding having to rasterize the DOM 802 for every frame as these complex graphics processing elements change from frame to frame. For instance, given an online game where a character is lit by torchlight that flickers, the character may not move, but the lighting will flicker and change every frame. Rather than rasterize the DOM underlying the character every frame merely to show the changing light, one or more textures 806 making up the character can have different lighting processing applied every frame within the GPU memory. Other complex transformations include depth determinations (e.g., to determine which textures occlude others in the browser window) and alpha blending, to name two. What this shows, is that GPU tiling allows many changes to textures to be made within the relatively fast GPU memory without having to re-rasterize the DOM for a given texture. This greatly improves the rendering speed of complex graphics. Only when the content of the texture itself changes does the DOM need to be re-rasterized.

Composition can then be carried out on the resulting transformed/processed texture 808 to combine all overlapping textures 806 and transformed/processed textures 808 for a given GPU tile. The composited GPU tiles 810 can then be copied back to system memory into the frame buffer 812 and displayed.

While the above-described process of GPU tile rendering is often preferred for complex graphics and instances where large overlap occurs, web browsers see much less of this type of complex processing than other applications. In many cases, little to no overlap, little to no transparency, little to no complex graphics processing, and little to no transformations of textures are seen in browser engine rendering. Therefore, the overhead of GPU tiling may not be worth the limited use of GPU tiled rendering that takes place. For browser engine rendering, direct mode rendering may be preferred, since this rendering often only involves a single rendering step per browser tile (e.g., no shaders, rotations, or transparency are applied). In these cases, the browser engine can take the browser tiles in the bitmaps 804 and perform composition with the frame buffer 812 as the rendering target. In other words, the GPU still performs composition, but does not render to the GPU cache, and therefore can take advantage of the much larger system memory to avoid having to divide up the browser window into GPU tiles.

Technologies for switching between direct and tiled rendering do exist (e.g., QUALCOMM'S FlexRender). However, such existing technologies operate at the driver level and therefore only analyze code to be rendered at a very low level. The instant disclosure in contrast, looks at the HTML/DOM, or high level code, to determine whether direct or tiled rendering should be carried out. Existing technologies must expend significant resources just to determine whether direct rendering is possible. However, the instant disclosure, since it looks at high level code, can more efficiently make such a determination than is possible in the art. For instance, FlexRender uses the GPU to process geometries to be rendered, and determine a number of rectangles contributing to each pixel (or group of pixels) in the render target (or within a GPU tile of the render target), to determine whether direct rendering is possible. In other words, FlexRender uses the GPU to determine how much memory accesses to and from the render target will be required given a set of geometries to be rendered, and if the number of accesses is below a threshold, then direct rendering can be used. The instant disclosure does not use the GPU to determine whether direct rendering is possible. Rather, the rendering mode analysis component (e.g., 108 in FIG. 1) can be implemented as an executable stored in system memory and executed on a processing portion of the computing device other than the GPU. This frees up the limited GPU resources for performing other tasks.

Although this disclosure has so far suggested that the entire browser window is analyzed when determining whether to enter direct-rendering or tiled-rendering mode, in other embodiments, the analysis can look to less than the entire browser window. For instance, when a browser displays video (e.g., inline video) or an HTML5 canvas or WebGL element, the area outside the video, HTML5 canvas, or WebGL element is often static or relatively static. In this example, the analysis may focus on the video, HTML5 canvas, or WebGL element of the browser window and discount the area outside of this, or apply weightings to these two areas, such that the video, HTML5 canvas, or WebGL element receives a higher weighting than the area outside the video, HTML5 canvas, or WebGL element. Additionally, composition can be limited to the video, HTML5 canvas, or WebGL element. The benefit of this technique is that even where composition of the webpage outside of the video, HTML5 canvas, or WebGL element, is complex, since it is static, these portions of the webpage can be maintained in the render target and the determination regarding direct versus tiled-rendering can focus only on the dynamic portions of the webpage (i.e., the video, HTML5 canvas, or WebGL element).

FlexRender, in contrast, actually cannot handle the HTML5 canvas and WebGL examples described above. In particular, the browser controls two GL contexts: one for the canvas and one for the compositor. The browser uses the GPU to render the canvas and then perform composition. This process repeats for each frame. By forcing composition to be performed via direct rendering, this enables the canvas' render target (or part of it) to remain in graphics memory for the next frame, something than cannot be done by FlexRender since it cannot anticipate what is going to happen in a next frame.

Figure 9:
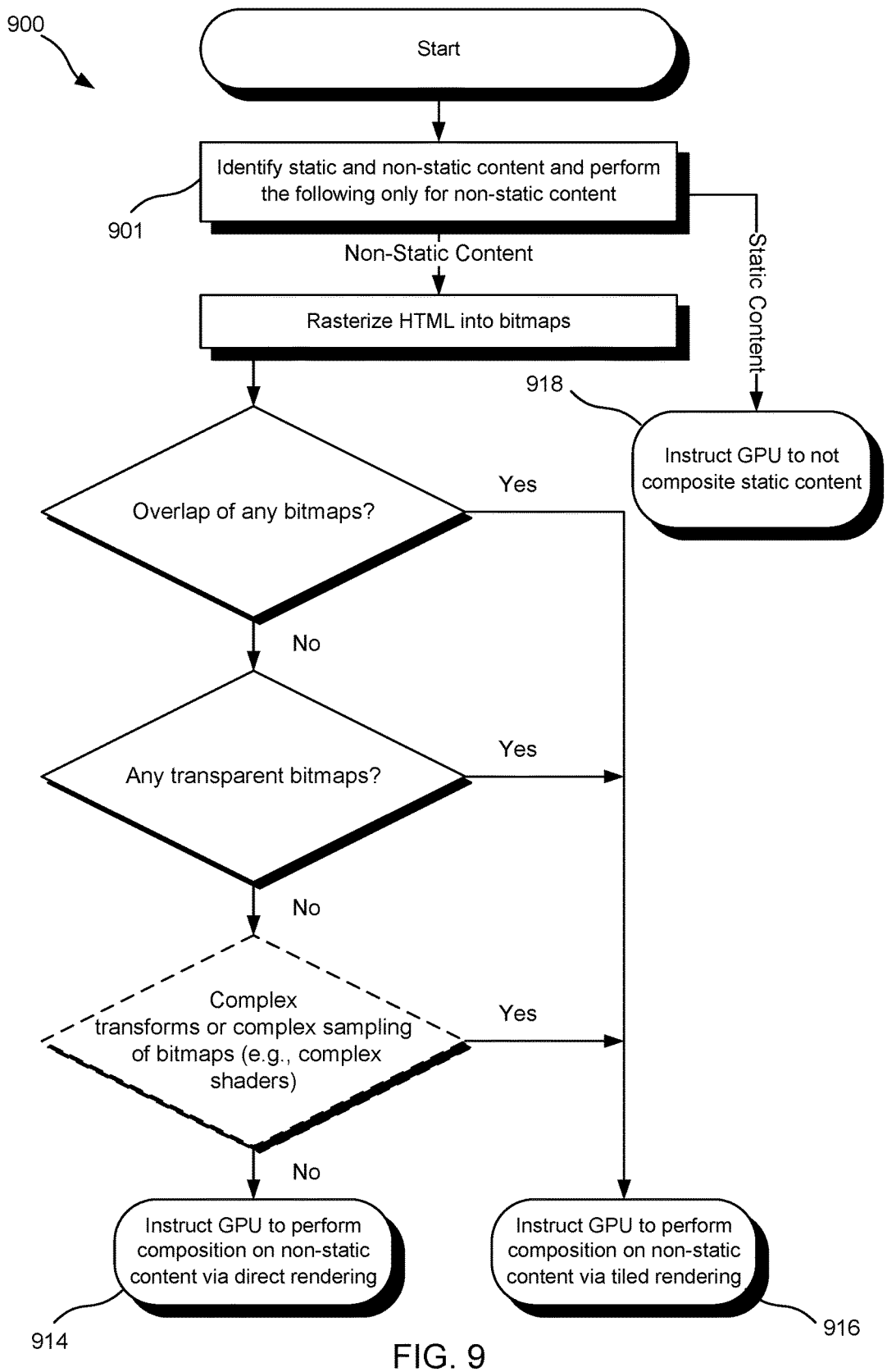
FIG. 9 illustrates a variation of FIG. 2 for embodiments where static content does not see composition, while non-static content is composited via either direct or tiled rendering.
Figure 10:
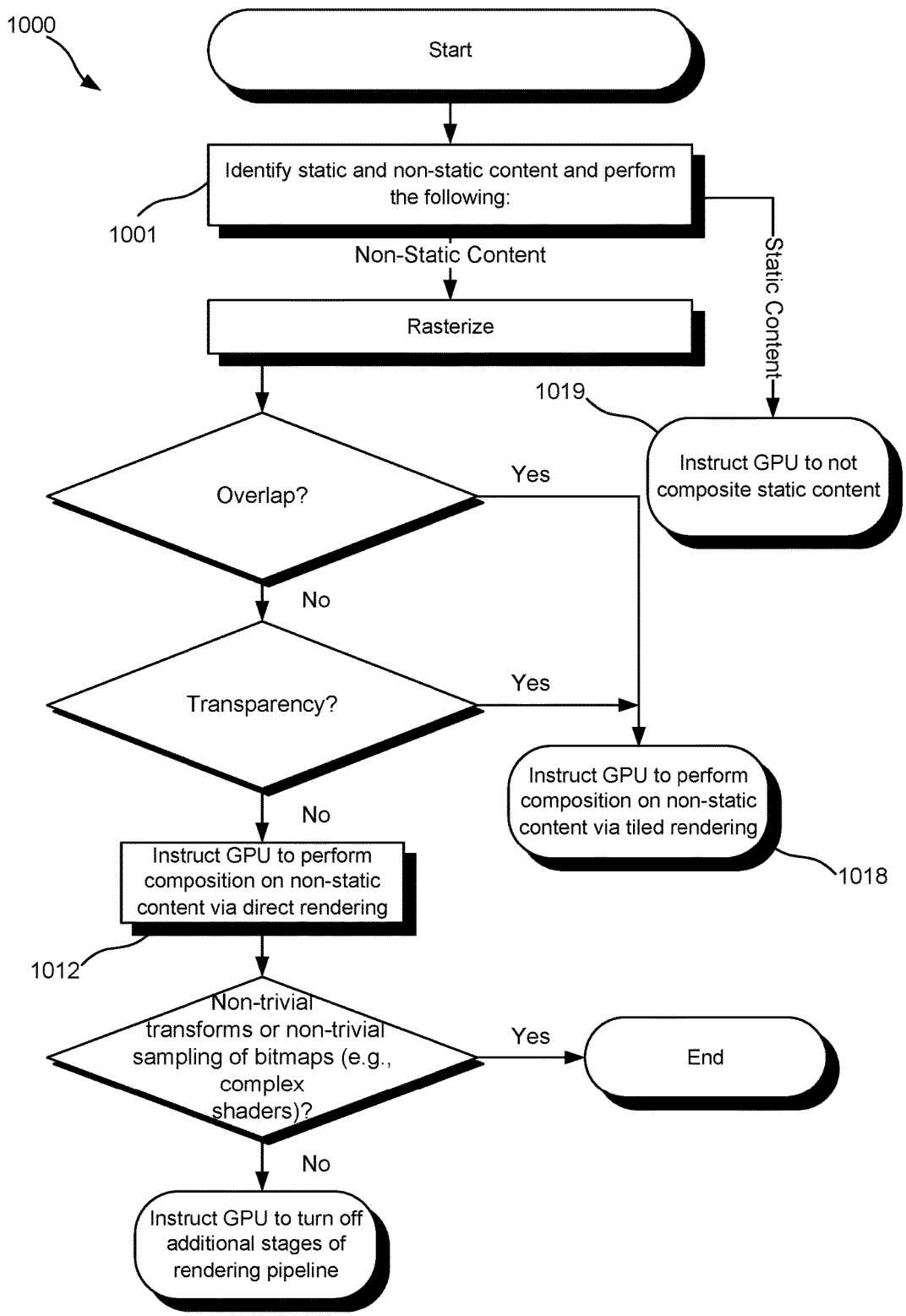
FIG. 10 illustrates a variation of FIG. 3 for embodiments where static content does not see composition, while non-static content is composited via either direct or tiled rendering.

FIGS. 9 and 10 illustrate variations of FIGS. 2 and 3 for embodiments where static content does not see composition (Blocks 918 and 1019), while non-static content (e.g., video, an HTML5 canvas, or WebGL element, to name a few) is composited via either direct or tiled rendering according to the methods described in FIGS. 2 and 3. In an embodiment, static and non-static content can be identified (Blocks 901 and 1001), and then the determination as to the preferred rendering method may only be carried out relative to the non-static content. The end result is that the browser does not composite static content while it does composite non-static content (e.g., an HTML5 canvas) via either direct rendering (Blocks 914 and 1012) or tiled rendering (Blocks 916 and 1018).

Figure 5:
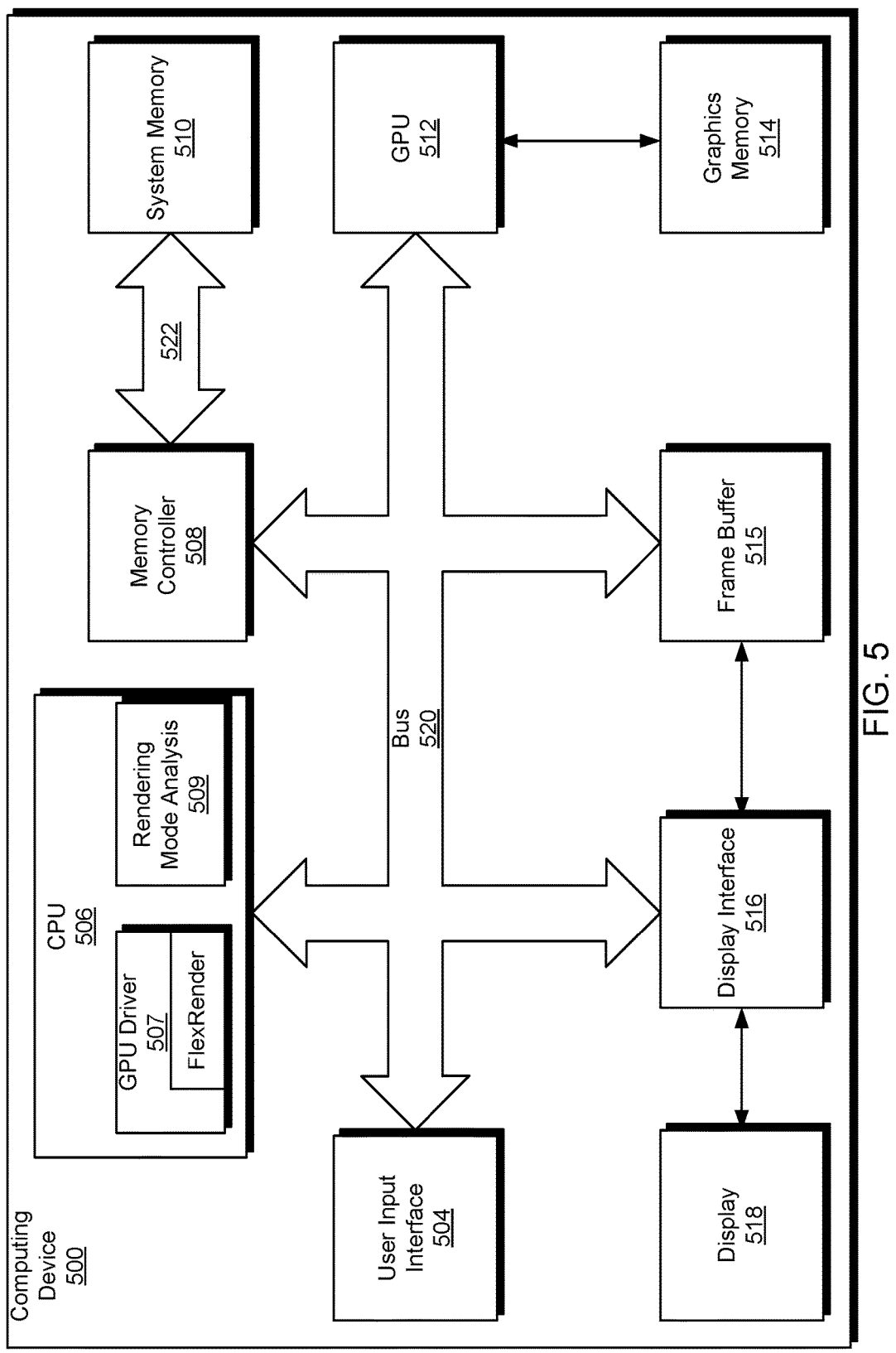
FIG. 5 is a block diagram illustrating an example computing device 502 that may be used to implement the techniques of this disclosure for determining a rendering mode and switching between rendering modes.

FIG. 5 is a block diagram illustrating an example computing device 502 that may be used to implement the techniques of this disclosure for determining a rendering mode and switching between rendering modes (e.g., between a binning rendering mode and a direct rendering mode). Computing device 502 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 5, computing device 502 may include a user input interface 504, a central processing unit (CPU) 506, a memory controller 508, a system memory 510, a graphics processing unit (GPU) 512, a graphics memory 514 (e.g., GPU cache), a display interface 516, a display 518 and buses 520 and 522. Note that in some examples, graphics memory 514 may be "on-chip" with the GPU 512. In some cases, all hardware elements show in FIG. 5 may be on-chip, for example, in a system on a chip (SoC) design. User input interface 504, CPU 506, memory controller 508, GPU 512 and display interface 516 may communicate with each other using bus 520. Memory controller 508 and system memory 510 may also communicate with each other using bus 522. Buses 520, 522 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 5 is merely exemplary, and other configurations of computing devices and/or other graphics processing systems with the same or different components may be used to implement the techniques of this disclosure.

CPU 506 may comprise a general-purpose or a special-purpose processing portion that controls operation of computing device 502, and in particular, controls switching between direct and tiled rendering. A user may provide input to computing device 502 to cause CPU 506 to execute one or more software applications. The software applications that execute on CPU 506 may include, for example, an operating system, a word processor application, an email application, a spread sheet application, a media player application, a video game application, a graphical user interface application or another program. Additionally, CPU 506 may execute a GPU driver 507 for controlling the operation of GPU 512. The user may provide input to computing device 502 via one or more input devices (not shown) such as a keyboard, a mouse, a microphone, a touch pad or another input device that is coupled to computing device 502 via user input interface 504.

The software applications that execute on CPU 506 may include one or more graphics rendering instructions (e.g., as part of a browser engine) that instruct CPU 506 to cause the rendering of graphics data to display 518. In some examples, the software instructions may conform to a graphics application programming interface (API), such as, e.g., an Open Graphics Library (OpenGL®) API, an Open Graphics Library Embedded Systems (OpenGL ES) API, or any other public or proprietary standard graphics API. In order to process the graphics rendering instructions, a browser engine running on the CPU 506 may issue one or more graphics rendering commands to GPU 512 (e.g., through GPU driver 507) to cause GPU 512 to perform some or all of the rendering of the graphics data. The browser engine may also include a rendering mode analysis component 509 (similar to the component 109 in FIG. 1), that analyzes HTML of webpages to be rendered and instructs the GPU 512 to operate in tiled-rendering or direct-rendering mode.

Memory controller 508 facilitates the transfer of data going into and out of system memory 510. For example, memory controller 508 may receive memory read and write commands, and service such commands with respect to system memory 510 in order to provide memory services for the components in computing device 502. Memory controller 508 is communicatively coupled to system memory 510 via memory bus 522. Although memory controller 508 is illustrated in FIG. 5 as being a processing module that is separate from both CPU 506 and system memory 510, in other examples, some or all of the functionality of memory controller 508 may be implemented on one or both of CPU 506 and system memory 510.

System memory 510 may store program modules and/or instructions that are accessible for execution by CPU 506 and/or data for use by the programs executing on CPU 506. For example, system memory 510 may store a window manager application that is used by CPU 506 to present a graphical user interface (GUI) on display 518. System memory 510 may also store executable code for running a browser engine on the CPU 506. In addition, system memory 510 may store user applications and application surface data associated with the applications. System memory 510 may additionally store information for use by and/or generated by other components of computing device 502. For example, system memory 510 may act as a device memory for GPU 512 and may store data to be operated on by GPU 512 as well as data resulting from operations performed by GPU 512. System memory may also act as the render target for the GPU 512 during direct rendering. As another example, system memory 510 may store any combination of texture buffers, depth buffers, stencil buffers, vertex buffers, frame buffers, or the like. System memory 510 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 512 may be configured to perform graphics operations to render one or more bitmaps from the browser engine to display 518. Thus, when a browser engine uses graphics processing, CPU 506 may provide graphics commands and graphics data to GPU 212 for rendering to display 518. The graphics data may include, e.g., drawing commands, state information, primitive information, texture information, etc. GPU 512 may, in some instances, be built with a highly-parallel structure that provides more efficient processing of complex graphic-related operations than CPU 506. For example, GPU 512 may include a plurality of processing elements that are configured to operate on multiple vertices or pixels in a parallel manner. The highly-parallel nature of GPU 512 may, in some instances, allow GPU 512 to draw graphics images (e.g., GUIs and two-dimensional (2D) and/or (3D) graphics scenes) onto display 518 more quickly than drawing the scenes directly to display 518 using CPU 506.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a non-transitory, tangible processor storage medium embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system comprising:
   a processing portion;
   a system memory;
   a graphics processing unit having a graphics memory thereon;
   a browser engine rendering mode analysis component stored on the system memory and executable on the processing portion to, without using the graphics processing unit:
   parse webpage HTML content to create a document object model (DOM) tree;
   calculate a layout of elements in the DOM tree to determine how elements of the webpage are grouped into layers and where the elements of the webpage are drawn;
   access from system memory bitmaps rasterized from the webpage HTML;
   compute, using the calculated layout of elements, a weighted total of pixels in a composition of intersecting pixels of other of the bitmaps, the weighting calculated from: (1) a number of transparent pixels that overlap with pixels of other bitmaps; and (2) a number of instances of processing of complex shaders that is to occur before composition; and determine that the weighted total of pixels is less than or equal to a direct-rendering mode threshold, and in response, to:

instruct the graphics processing unit to render the bitmaps directly to the system memory without rendering to the graphics memory; and instruct the graphics processing unit to enter a lower-power state.

2. The system of claim 1, wherein the direct-rendering mode threshold equals twice a number of pixels in a browser window that encompasses the bitmaps that are rendered to the system memory.

3. The system of claim 1, wherein rotation of a texture is one of the complex shaders.

\* \* \* \* \*